United States Patent
Penney et al.

(10) Patent No.: US 10,344,901 B2
(45) Date of Patent: Jul. 9, 2019

(54) FLUID CONNECTOR FOR MULTI-WELL OPERATIONS

(71) Applicant: MWFC INC., Clairmont (CA)

(72) Inventors: Bradley Penney, Calgary (CA); Brian Allison, Clairmont (CA)

(73) Assignee: MWFC INC., Clairmont, AB (CA)

(*) Notice: Subject to any disclaimer, the term of this patent is extended or adjusted under 35 U.S.C. 154(b) by 0 days.

(21) Appl. No.: 15/889,818

(22) Filed: Feb. 6, 2018

(65) Prior Publication Data

US 2018/0224044 A1    Aug. 9, 2018

Related U.S. Application Data

(60) Provisional application No. 62/454,975, filed on Feb. 6, 2017.

(51) Int. Cl.
*E21B 33/068* (2006.01)
*E21B 34/02* (2006.01)
*E21B 41/00* (2006.01)
*E21B 43/26* (2006.01)
*F16L 41/03* (2006.01)

(52) U.S. Cl.
CPC .............. *F16L 41/03* (2013.01); *E21B 34/02* (2013.01); *E21B 41/00* (2013.01); *E21B 43/26* (2013.01)

(58) Field of Classification Search
CPC ........ E21B 33/068; E21B 34/02; E21B 41/00; E21B 43/26; F16L 41/03
See application file for complete search history.

(56) References Cited

U.S. PATENT DOCUMENTS

| 3,381,753 A | 5/1968 | Fredd |
| 3,562,014 A | 2/1971 | Childers et al. |
| 7,240,736 B2 | 7/2007 | Fenton et al. |
| (Continued) | | |

FOREIGN PATENT DOCUMENTS

| CN | 203178161 U | 9/2013 |
| CN | 203929572 U | 11/2014 |
| WO | 2016062314 A1 | 4/2016 |

OTHER PUBLICATIONS

Nadezhda Zheleva, "Challenges in Subsea Structures Design—Dropped Objects Analysis of Multiwell Template/manifold System", Master's thesis, Issued Jun. 15, 2016, University of Stavanger, Norway.

*Primary Examiner* — Matthew R Buck
(74) *Attorney, Agent, or Firm* — Davis & Bujold PLLC; Michael J. Bujold

(57) ABSTRACT

A fluid connector for connecting a fluid source to supply fluid to conduct downhole operations in a plurality of wells is provided. The fluid connector has a fluid conduit with first and second fluid inlets and a plurality of fluid outlets connecting the fluid source to the wells. The fluid outlets are connected in series between the first and second fluid inlet. The fluid conduit defines a flow path between each fluid inlet and each fluid outlet, and in operation, the first and second fluid inlets are connected to receive fluid from the fluid source, and the fluid outlets are connected to supply fluid to the wells. The fluid connector also has a plurality of isolation valves connected downstream of each fluid outlet relative to the first and second fluid inlets, and the fluid is selectively supplied to the wells by opening and closing the isolation valves.

16 Claims, 8 Drawing Sheets

(56) References Cited

U.S. PATENT DOCUMENTS

| | | | |
|---|---|---|---|
| 7,367,399 B2 | 5/2008 | Steele et al. | |
| 8,474,521 B2 | 7/2013 | Kajaria et al. | |
| 8,534,069 B2 | 9/2013 | Parrella | |
| 8,800,667 B2 | 8/2014 | Seim | |
| 9,127,545 B2* | 9/2015 | Kajaria | E21B 43/26 |
| 9,222,345 B2 | 12/2015 | Conrad | |
| 9,903,190 B2* | 2/2018 | Conrad | E21B 43/26 |
| 2010/0300672 A1* | 12/2010 | Childress | E21B 43/26 |
| | | | 166/52 |
| 2012/0174581 A1 | 7/2012 | Vaughan et al. | |
| 2012/0181013 A1* | 7/2012 | Kajaria | E21B 43/26 |
| | | | 166/79.1 |
| 2012/0181015 A1* | 7/2012 | Kajaria | E21B 43/26 |
| | | | 166/177.5 |
| 2012/0181016 A1* | 7/2012 | Kajaria | E21B 43/26 |
| | | | 166/177.5 |
| 2012/0181046 A1* | 7/2012 | Kajaria | E21B 43/16 |
| | | | 166/380 |
| 2014/0318763 A1 | 10/2014 | Hearn | |
| 2015/0000766 A1 | 1/2015 | Arizpe et al. | |
| 2015/0184491 A1 | 7/2015 | Kajaria et al. | |
| 2016/0312596 A1 | 10/2016 | Leroux | |
| 2017/0123437 A1 | 5/2017 | Boyd et al. | |
| 2018/0179848 A1* | 6/2018 | Cherewyk | E21B 33/068 |

\* cited by examiner

FLUID CONNECTOR FOR MULTI-WELL OPERATIONS

TECHNICAL FIELD

This relates to a connector that facilitates frac fluid delivery to wells undergoing an operation, such as a pumpdown operation or a hydraulic fracturing operation, and in particular, a connector that is preferably modular and reduces the number of valves required between the frac fluid source and the wells that are being treated.

BACKGROUND

Fluid may be pumped into a well during different operations. For example, a pumpdown operation may be used to move various types of tools or equipment downhole. Another common operation includes hydraulic fracturing, or fracing, which is used to stimulate the production of hydrocarbons by applying sufficient pressure to fracture an underground formation. This requires a high rate of fluid to be supplied at high pressures. Often, the frac fluid will carry a proppant, such as sand, that enters the fractures in the formation to keep them open.

For multi-well operations, a fracing manifold is typically used to distribute frac fluid from the frac pumping units to a desired well. One example of a fracing manifold is shown in U.S. Pat. No. 9,127,545 (Kajaria et al.) entitled "Delivery System for Fracture Applications", which describes a modular, adjustable system that uses valves to direct frac fluid to a subject well that is receiving a frac treatment. These frac manifold valves are also typically used to isolate the wells that are not being treated.

SUMMARY

According to an aspect, there is provided a fluid connector for connecting a fluid source to supply fluid to a plurality of wells to conduct a downhole operation, the fluid connector comprising a fluid conduit that connects the fluid source to the plurality of wells, the fluid conduit comprising a first fluid inlet, a second fluid inlet, and a plurality of fluid outlets connected in series between the first fluid inlet and the second fluid inlet such that the fluid conduit defines a flow path between each fluid inlet and each fluid outlet, wherein, in operation, the first and second fluid inlets are connected to receive fluid from the fluid source, and the plurality of fluid outlets are connected to supply fluid to the plurality of wells and a plurality of isolation valves connected downstream of each fluid outlet relative to the first and second fluid inlets, wherein the fluid is selectively supplied to the plurality of wells by opening and closing the isolation valves.

According to other aspects, the fluid may be selectively supplied to the plurality of wells by selectively opening and closing the plurality of isolation valves, each of the first and second fluid inlets and the plurality of fluid outlets may comprise two or more parallel ports, and the fluid conduit may comprise one section of piping connected between ports of adjacent fluid inlets and outlets or more than one section of piping connected in parallel between ports of adjacent fluid inlets and fluid outlets, and the fluid conduit may be devoid of valves such that the flow path is open between each fluid inlet and each fluid outlet.

According to an aspect, there is provided, in combination, a fluid source, a plurality of wells, and a fluid connector that connects the fluid source to the plurality of wells, the fluid connector comprising a fluid conduit that connects the fluid source to the plurality of wells, the fluid conduit comprising a first fluid inlet, a second fluid inlet, and a plurality of fluid outlets connected in series between the first fluid inlet and the second fluid inlet such that the fluid conduit defines a flow path between each fluid inlet and each fluid outlet, wherein, in operation, the first and second fluid inlets are connected to receive fluid from the fluid source, and the plurality of fluid outlets are connected to supply fluid to the plurality of wells, and a plurality of isolation valves connected downstream of each fluid outlet relative to the first and second fluid inlets, wherein the fluid is selectively supplied to the plurality of wells by opening and closing the isolation valves.

According to other aspects, the isolation valves may be selectively operable to supply fluid to a single one of the plurality of wells at a time, and the isolation valves may be selectively operable to change to another single one of the plurality of wells without restricting the flow path between each fluid inlet and each fluid outlet.

According to an aspect, there is provided a method of conducting a downhole operation in a plurality of wells, comprising the steps of connecting a fluid source to the plurality of wells using a fluid connector, the fluid connector comprising a fluid conduit comprising a first fluid inlet, a second fluid inlet, and a plurality of fluid outlets, wherein the first and second fluid inlets are connected to receive fluid from the fluid source, and the plurality of fluid outlets are connected to supply fluid to the plurality of wells, the plurality of fluid outlets being connected in series between the first fluid inlet and the second fluid inlet, and a plurality of isolation valves connected downstream of each fluid outlet relative to the first and second fluid inlet, and selectively opening and closing the isolation valves to selectively supply fluid to the plurality of wells.

According to other aspects, fluid may be supplied to a single one of the plurality of wells at a time, the fluid may be supplied to the fluid outlet connected to the single one of the plurality of wells simultaneously along parallel fluid paths from each of the first fluid inlet and the second fluid inlet, each of the first and second fluid inlets and the plurality of fluid outlets may comprise two or more parallel ports, and the method may further comprise the step of selectively connecting one or more sections of piping between parallel ports that are adjacent along the flow path and to define a desired flow area of the fluid conduit, fluid may be selectively supplied to the plurality of wells by opening and closing the isolation valves and without restricting the flow path along the fluid conduit, and the downhole operation may be a hydraulic fracturing operation or a pumpdown operation.

According to an aspect, there is provided a fluid connector for conducting a downhole operation, the fluid connector connecting a fluid source to a plurality of wells, the fluid connector comprising a fluid conduit that connects the fluid source to the plurality of wells, the fluid conduit comprising one or more fluid inlets, and a plurality of fluid outlets, wherein the one or more fluid inlets are connected to receive fluid from the fluid source, and the plurality of fluid outlets are connected to supply fluid to the plurality of wells, wherein each of the one or more fluid inlets and the plurality of fluid outlets comprises two or more parallel ports, the fluid conduit comprising one or more sections of piping selectively connectable between respective ports of adjacent fluid inlets and outlets to define a desired flow area of the fluid conduit.

According to other aspects, two or more sections of piping may be connected in parallel between adjacent fluid inlets and outlets to increase the flow area of the fluid conduit, the fluid connector may comprise a first fluid inlet and a second fluid inlet, the plurality of fluid outlets may be connected in series between the first fluid inlet and the second fluid inlet, and the fluid connector may further comprise a plurality of isolation valves connected downstream of each fluid outlet relative to the first and second fluid inlets, wherein the fluid may be selectively supplied to the plurality of wells by the isolation valves, the fluid may be selectively supplied to the plurality of wells by selectively opening and closing the plurality of isolation valves, the fluid used to conduct the downhole operation may be supplied to one of the plurality of wells at a time, the fluid may be supplied to the fluid outlet connected to the one of the plurality of wells along parallel fluid paths from each of the first fluid inlet and the second fluid inlet, the parallel fluid paths may be unrestricted as the isolation valves are opened and closed.

According to an aspect, there is provided a method of supplying fluid to a plurality of wells for a downhole operation, comprising the steps of determining a minimum flow area of a fluid conduit, the flow area being based on the maximum flow rate required for the downhole operation, connecting a fluid connector between a fluid source and the plurality of wells, the fluid connector comprising a plurality of fluid connection elements, the plurality of fluid connection elements comprising one or more fluid inlets that receives fluid from the fluid source, and a plurality of fluid outlets that supplies the fluid to the plurality of wells, each of the plurality of fluid connection elements comprising two or more parallel ports, sections of piping that connect adjacent fluid connection elements and that define a fluid path of the fluid conduit from the one or more fluid inlets to the plurality of fluid outlets, the plurality of fluid connection elements being connected in series by the sections of piping, connecting sections of piping between ports of adjacent fluid connection elements to provide the fluid conduit with a flow area that is greater than or equal to the minimum flow, wherein more than one section of piping are connected in parallel between the ports of adjacent fluid connectors to provide a greater flow area, and selectively moving fluid through the fluid connector from the fluid source to one or more of the plurality of wells.

According to other aspects, the plurality of fluid connection elements may comprise a first fluid inlet and a second fluid inlet, the plurality of fluid outlets may be connected in series between the first fluid inlet and the second fluid inlet, and the method may further comprise the step of selectively supplying fluid to the plurality of wells by isolation valves connected downstream of each of the plurality of fluid outlets relative to the first and second fluid inlets, the fluid may be supplied to a single one of the plurality of wells at a time, the fluid may be supplied to the fluid outlet connected to the single one of the plurality of wells simultaneously along parallel fluid paths from each of the first fluid inlet and the second fluid inlet, fluid may be selectively supplied to the plurality of wells by opening and closing isolation valves downstream of each of the plurality of fluid outlets and without restricting the flow path along the fluid conduit, the downhole operation may be a hydraulic fracturing operation or a pumpdown operation, the parallel ports may comprise a first port and a second port, the first port having a smaller flow area than the second port, and the fluid conduit may comprise a low flow configuration in which sections of piping are connected between the first ports of adjacent fluid connectors, a medium flow configuration in which sections of piping are connected between the second ports of adjacent fluid connectors, and a high flow configuration in which sections of piping are connected in parallel between the first ports of adjacent fluid connectors and the second ports of adjacent fluid connectors.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
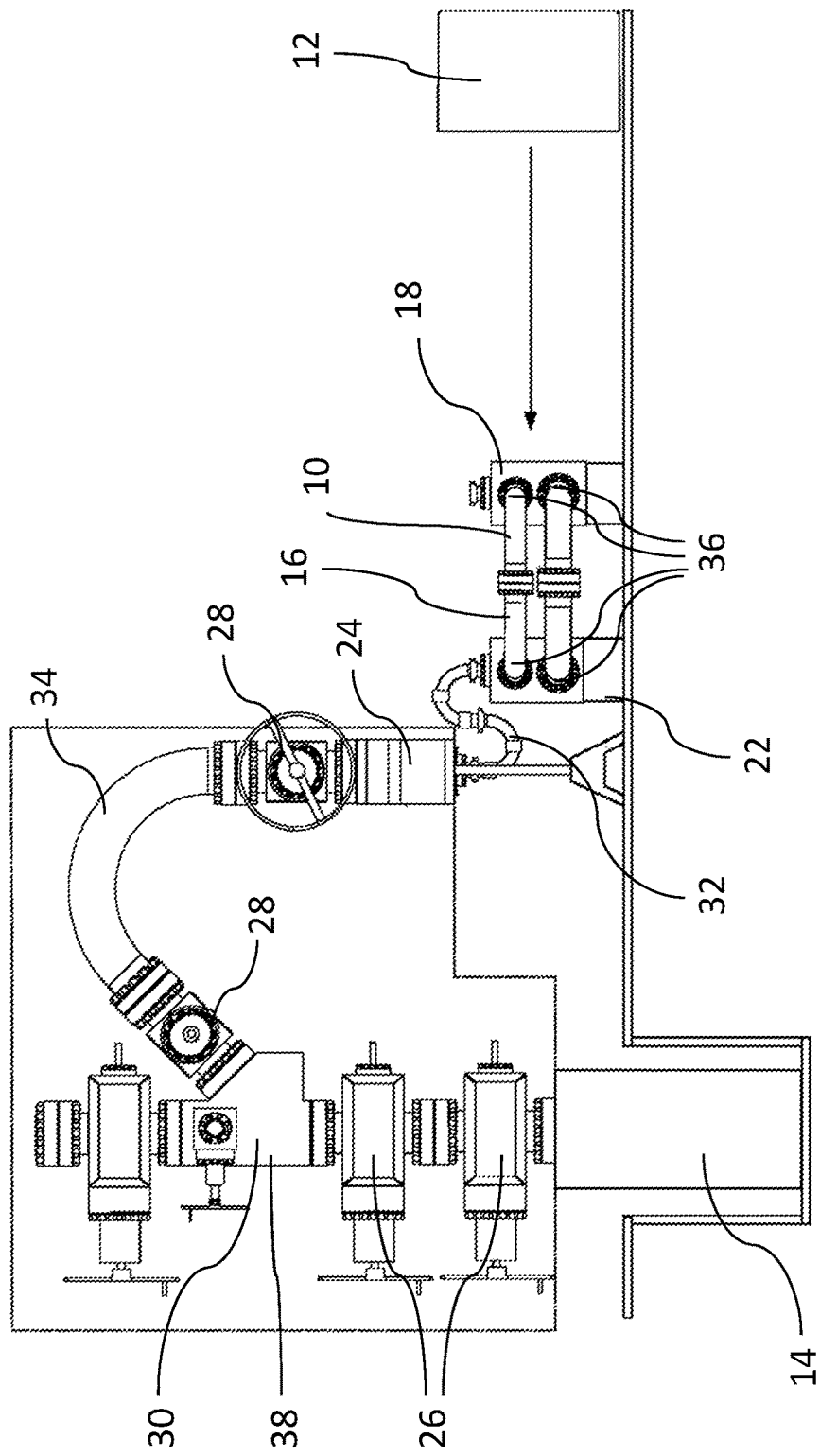
FIG. 1 is a side elevation view of a fluid connector for conducting a downhole operation connected to a frac tree of a well.
Figure 2:
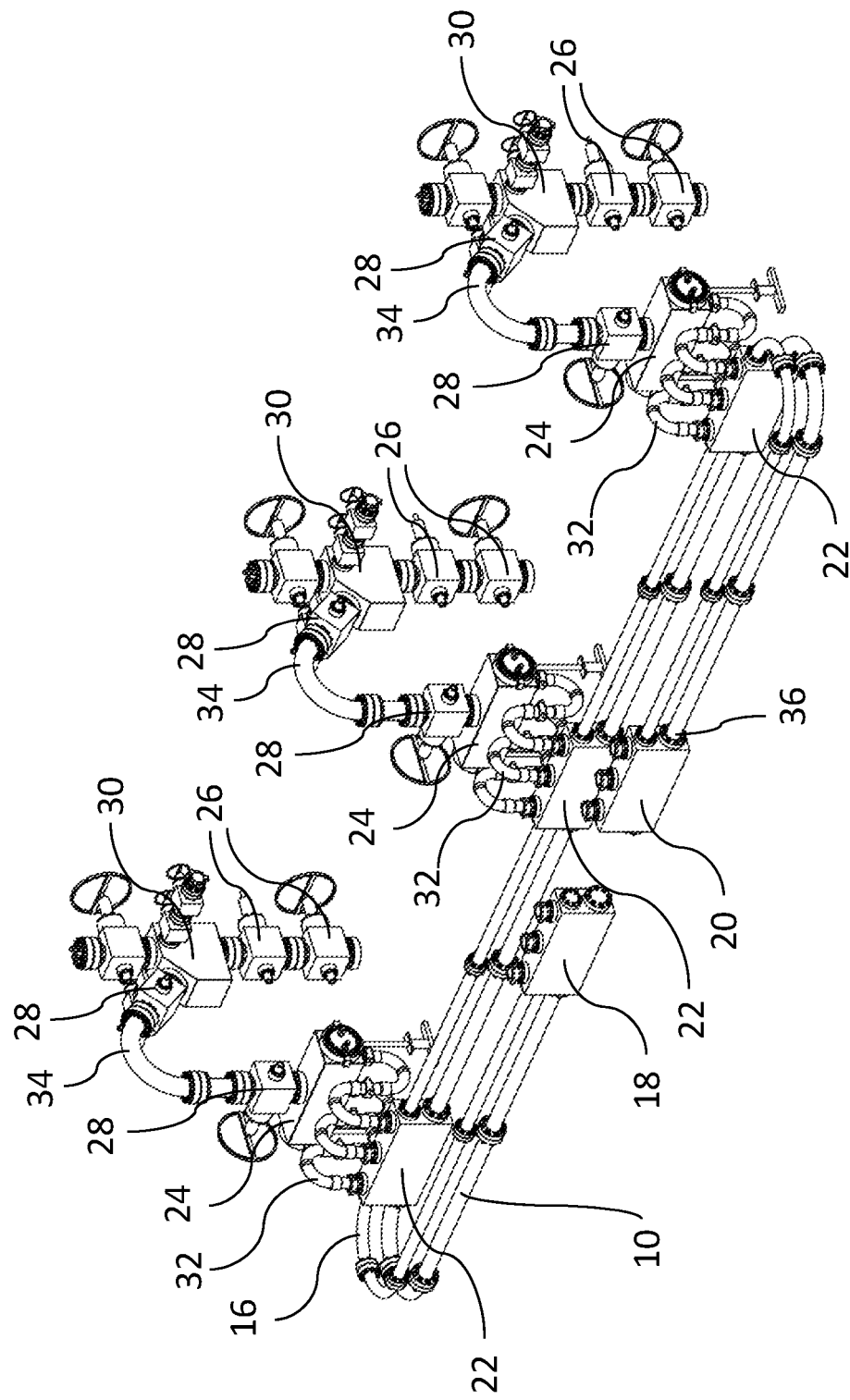
FIG. 2 is a perspective view of the fluid connector of FIG. 1.
Figure 3:
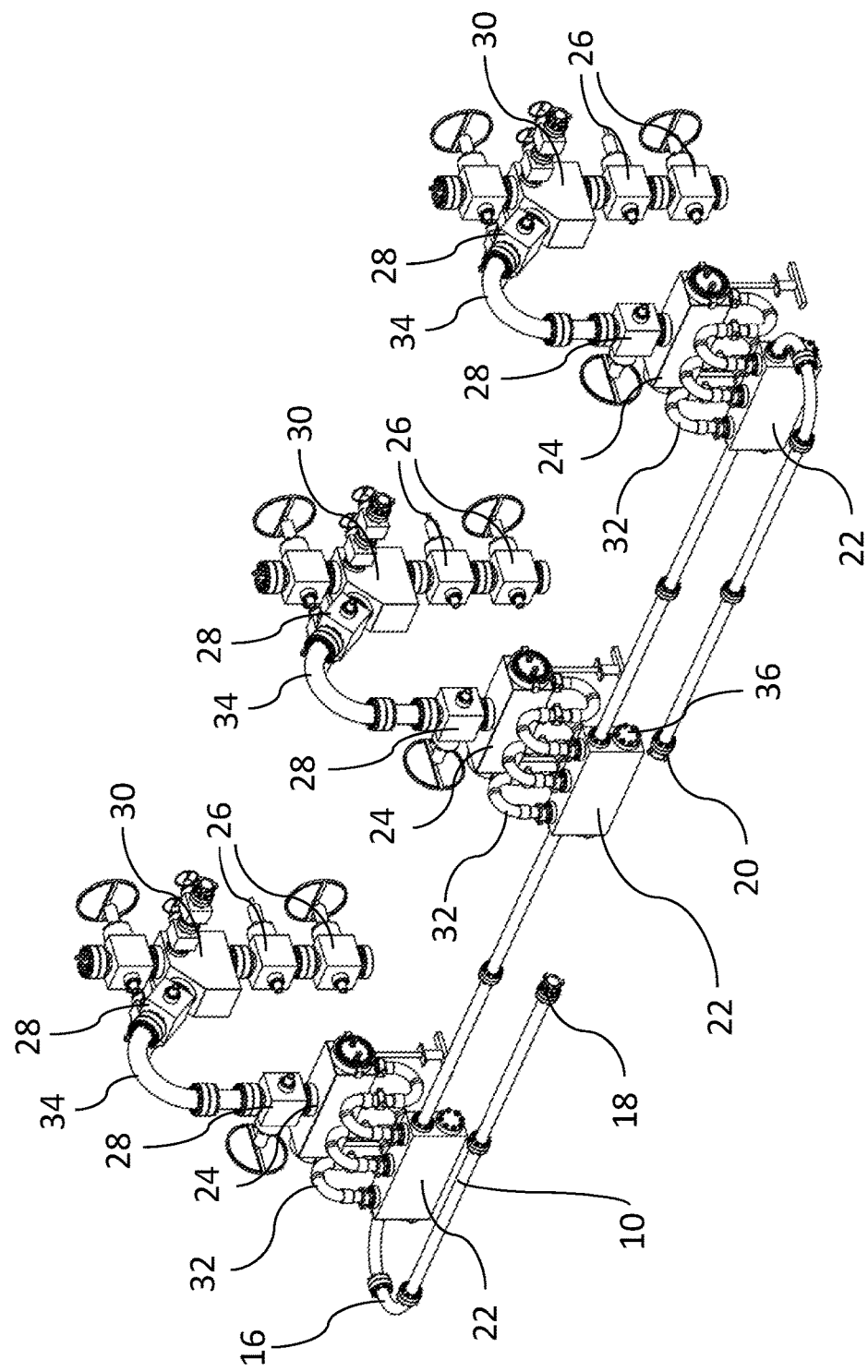
FIG. 3 is a perspective view of the fluid connector of FIG. 1 modified for a lower or reduced flow application.
Figure 4:
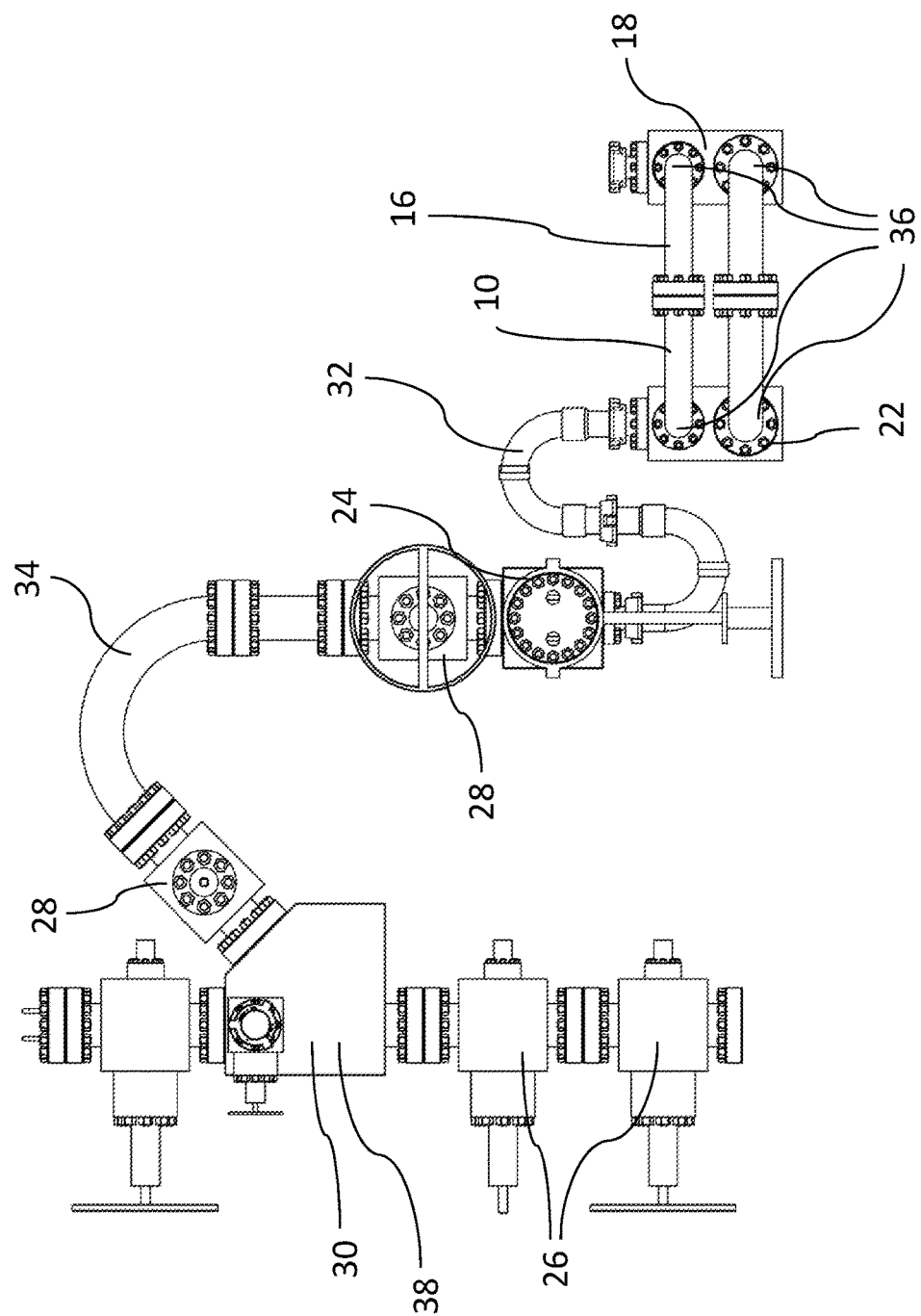
FIG. 4 is a side elevation view of a modified fluid connector for conducting a downhole operation.

Referring to FIG. 1, a fluid connector 10 for conducting a downhole operation, such as a pumpdown operation, a hydraulic fracturing operation, etc., is shown that may be used to connect a fluid pumping source 12 to a plurality of wells 14. The fluid connector 10 has a fluid conduit 16 that connects the fluid pumping source 12 to the plurality of wells 14. Referring to FIGS. 2 and 3, the fluid connector 10 has first fluid inlet 18 and second fluid inlet 20, or left and right fluid inlets 18, 20 as in the depicted configuration, which are target inlet headers 18, 20 to be connected to a fluid pumping source 12 or missile (not shown) in a usual manner. The fluid source 12 for a downhole operation may take various forms, as is known in the art, and depending on the type of operation being performed. For example, a hydraulic fracturing operation typically requires fluid to be provided at high volumes and high pressures relative to other operations. Such an operation typically involves a pumping station that draws fluid from a fluid reservoir. For example, the fluid reservoir may be multiple, smaller tanks that connect to the fluid inlets 18, 20 via the pumping station, or one or more larger tanks may be used. It will be understood that the inlets 18, 20 shown here may be designed to accommodate whatever fluid supply is being used, or that additional equipment may be connected to accommodate the fluid supply, as is known in the art. The equipment required for other operations will depend on a calculation or estimate of the volume of fluid required and any constraints on the rate or pressure at which the fluid must be supplied.

As shown, the fluid connector 10 has a plurality of fluid outlets 22, or fluid discharge headers 22, each of which is connected to a corresponding well 14. In the example shown in FIGS. 2 and 3, the plurality of fluid discharge headers 22 are connected in series between left and right target fluid inlet headers 18, 20 to form a loop, which is open at the left and right target header fluid inlets 18, 20. As will be understood from the discussion that follows, this design allows parallel flow paths from the left and right target fluid inlet headers 18, 20 to connect to each fluid outlet 22. These parallel flow paths make it possible for each fluid discharge header 22 to be supplied with fluid from two different directions, such that the multiple fluid inlet 18, 20 flows that enter into a subject discharge header 22 are combined and then the fluid is discharged through the outlet ports of the discharge header 22 to the corresponding well 14, such as an inlet frac tree header 24 as shown in FIGS. 2 and 3. In this example, frac tree valves 26 are positioned in an open position to receive the frac fluid treatment. Stimulating a different well 14 only requires the subject frac tree valves 26 to be cycled to an open position to receive the frac fluid treatment. In addition, this arrangement maintains a constant fluid flow through the fluid conduit 16 between the fluid inlets 18, 20 and the particular fluid outlet 22 in use. Similarly, for other types of operations, a particular well 14 may be isolated by closing isolation valves 28 corresponding to other wells 14 and leaving the isolation valves 28 that corresponds to the target well 14 open. While two isolation valves 28 are shown, the number of valves may vary depending on the circumstances. Furthermore, the location of the valves that are downstream of fluid outlets 22 and are used to isolate a particular well 14 may also vary depending on the design of the equipment downstream of fluid outlets 22.

As defined herein, the fluid connector 10 begins with the fluid inlets 18, 20, and ends with the fluid outlets 22. It will be apparent from the description herein that other equipment will be provided upstream and/or downstream of the fluid connector 10 in order to perform the downhole operation. For example, FIG. 1 depicts additional equipment that is used for a fracing operation, which includes a frac tree inlet header 24 connected to receive fluid from the fluid outlet 22, and a series of valves, including isolation valves 28 and master valves 26 connected between each frac tree inlet header 24 and the corresponding well 14 downstream of each frac tree inlet header 24. As will be understood, master valves 26, or valves in the same position as master valves 26, may also be used to isolate a well. However, in the depicted example, master valves 26, which are in line with the wellbore of well 14, are used to allow a well operation to be performed in one well 14 while fluid is being supplied through connector 10 to another well 14. While the use of two valves is common in fracing to provide a double block, the actual number may vary, depending on the demands of the situation, preferences of the user, applicable legislation, etc. Similarly, the number and configuration of valves 26, 28 may vary for from what is depicted for different types of downhole operations. There may be additional valves and equipment downstream of the frac fluid outlets 22 to improve the fracing operation by making it easier, safer, more efficient, etc. based on principles known in the art. Frac fluid is selectively supplied to the plurality of wells 14 by opening and closing these isolation valves 28. Typically, frac fluid is supplied to one well 14 at a time when conducting a hydraulic fracturing operation. While it has been mentioned that frac fluid flows continuously through the fluid connector 10 during a fracing operation, it will be understood that this may include periods of time during which fluid flow stops, such as when switching the frac pumping operation to a different well 14, for safety reasons, etc. The scheduling of when fluid will flow during a hydraulic fracturing operation, or other downhole operation, will be based on principles known in the art, and will not be discussed further.

Referring to FIG. 5-8, another arrangement of equipment is shown, where certain pieces of equipment are removed. While FIGS. 2 and 3 depicts an outlet header 22 and a frac tree inlet header 24 connected by swivel joints 32, FIG. 5 has been designed such that the frac tree 30 connects directly to the outlet header 22 via the sweeping trunkline 34.

As can be seen in FIGS. 2 and 3, fluid, i.e. fluid, such as water, is able to be supplied to one of the wells 14 simultaneously along parallel fluid paths from each of the left target fluid inlet 18 and the right target fluid inlet 20. As the valves 26, 28 that isolate the wells 14 are downstream from the fluid outlet 22 and the inlet header 18, 20, the fluid flow through the fluid connector 10 is not limited, but is merely redirected to exit through a different fluid outlet 22. As will be understood, the direction of fluid flow through any given section of tubing 16 that connects between fluid outlets 22 may be reversed, depending on the fluid outlet 22 that is being supplied. While the fluid direction through the first section of tubing 16 from each fluid inlet 18, 20, i.e. between the fluid inlet 18, 20 and the adjacent first fluid outlet 22, will be in the same direction, the fluid flow between the sections of tubing 16 between fluid outlets 22 will vary, depending on the well 14 that is receiving the fluid. It will also be recognized that, if the fluid conduit 16 is considered to be a loop, the flow from the first inlet 18 will be in an opposite direction relative to the flow from the second inlet 20, as the fluid flows in opposite directions through the fluid loop formed by the connector 16 from the point the fluid enters the connector 10 (i.e. the fluid inlets 18, 20) to the point the fluid exits the connector 10 (i.e. the fluid outlet 22 that is open). As a result, there will be a constant fluid flow through all sections of tubing 16 in the connector 10, regardless of the well 14 that receives the fluid. This is permitted as there are no valves related to the hydraulic fracturing operation (or other operation, as the case may be) present in the fluid connector 10. For safety or other purposes, additional valves may be included, however these are preferably connected outside the fluid connector 10, i.e. upstream of the inlets 18, 20, or downstream of the outlets 22, such that the fluid connector 10 is devoid of any valves to reduce costs and maintenance requirements.

Figure 5:
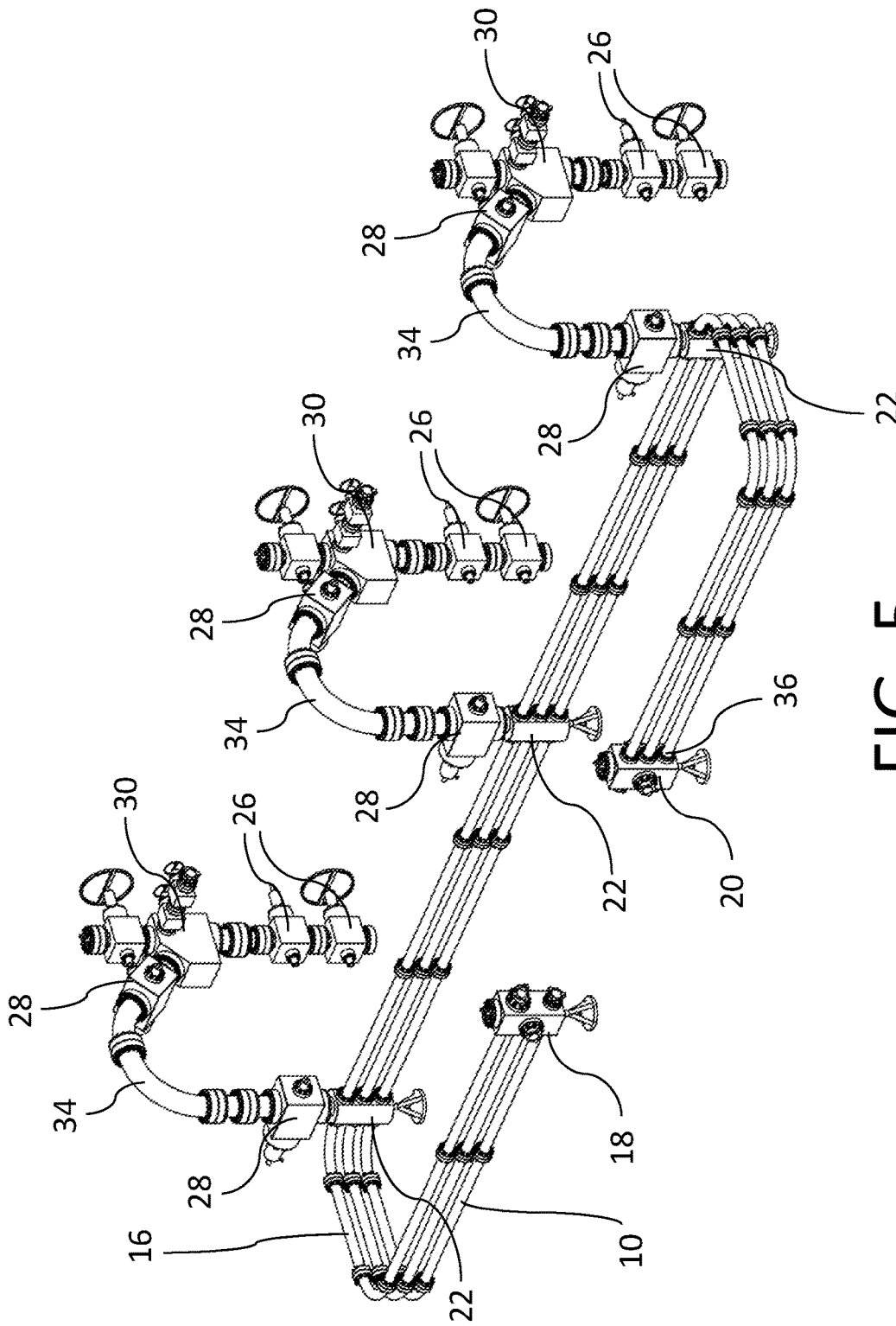
FIG. 5 is a perspective view of another arrangement for a fluid connector for conducting a downhole operation.
Figure 6:
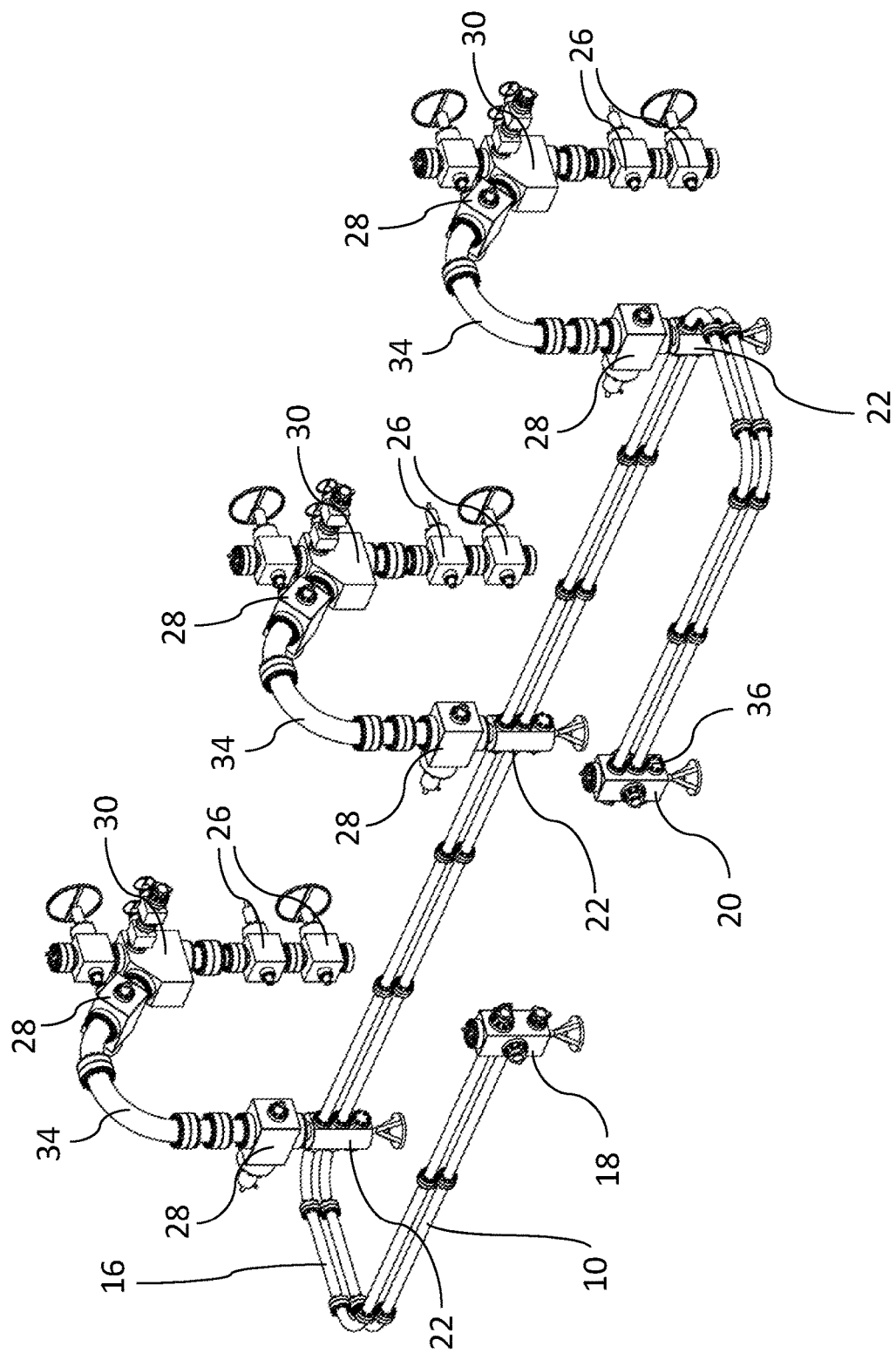
FIG. 6 is a perspective view of the fluid connector of FIG. 5 modified for a lower or reduced flow application.
Figure 7:
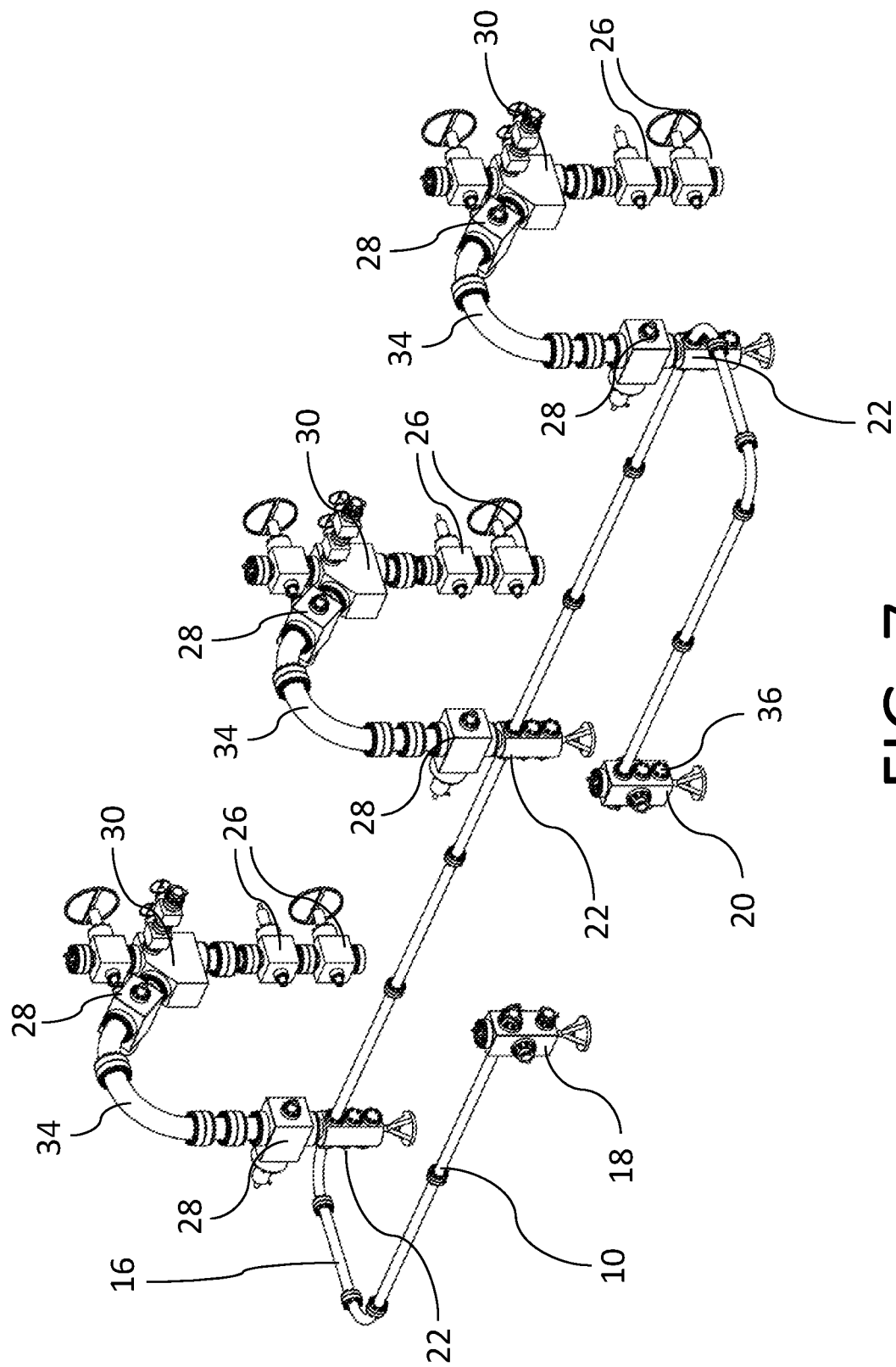
FIG. 7 is a perspective view of the fluid connector of FIG. 5 modified for a further lower or reduced flow application.
Figure 8:
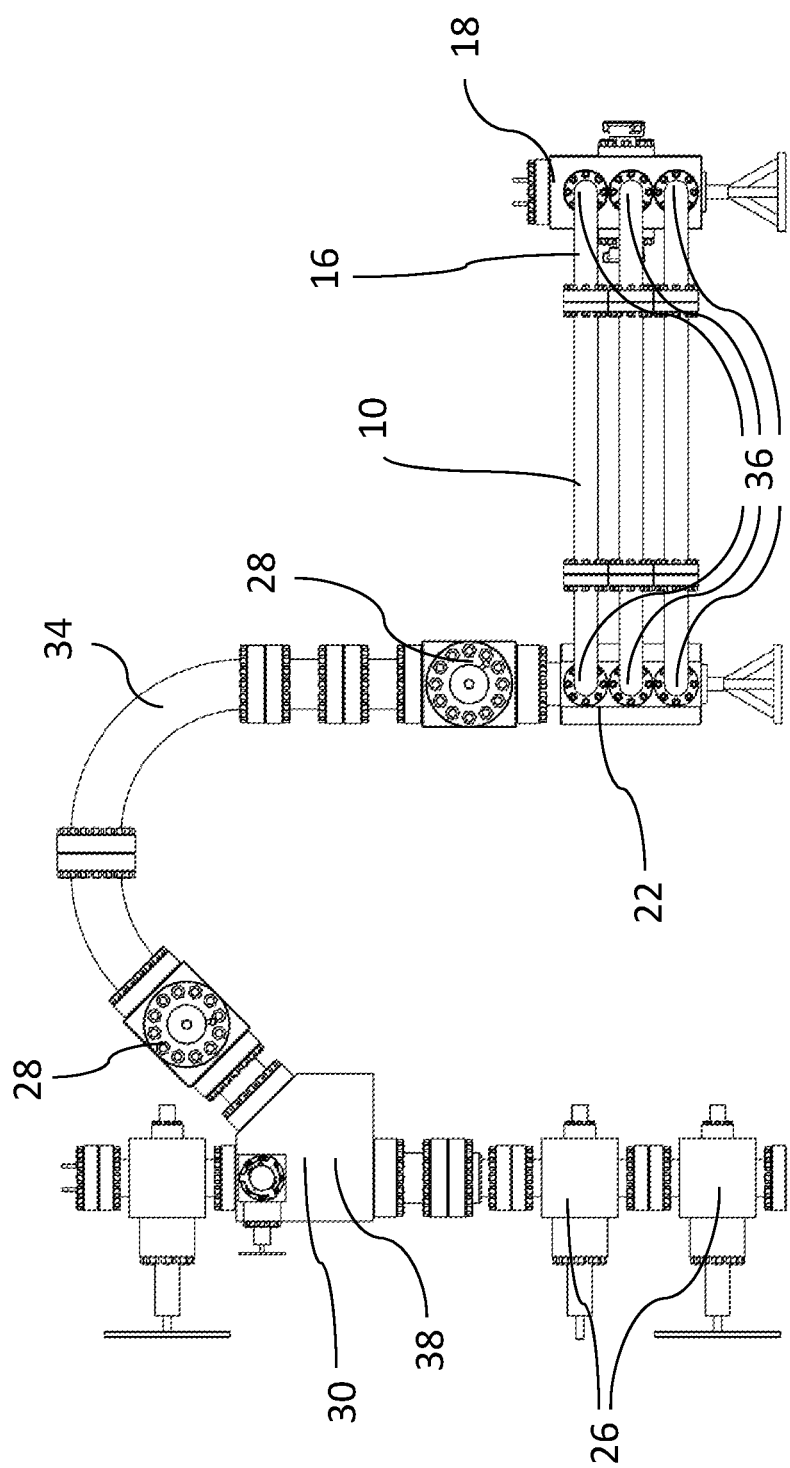
FIG. 8 is a side elevation view of the fluid connector of FIG. 5.

Referring to FIGS. 2 and 3, each of fluid connections 18, 20, 22, i.e. the left and right target fluid inlets 18, 20 and the plurality of fluid outlets 22, are shown with two parallel ports 36. Similarly, FIG. 5-7 show an example with three parallel ports 36. These ports 36 allow for different rates of flow. In the example shown in FIGS. 2 and 3, the ports 36 have different sizes, while in FIG. 5-7, the ports 36 have the same size. In either case, low, medium, and high rates of flow are able to be achieved based on which ports 36 are connected to tubing 16. Other options, such as a fluid connections 18, 20, 22 with only two ports 36 of the same size, or more than two ports 36 with different sizes, are also possible, depending on the possible flow areas that are desired by the user. Referring to FIGS. 3 and 7, a low flow configuration is shown, in which a single section of piping 16 is connected between a single port 36 of each fluid connections 18, 20, 22. A medium flow configuration is shown in FIG. 6, in which two sections of piping 16 are connected between two parallel ports 36 on each fluid connections 18, 20, 22. The example shown in FIG. 3 may be modified to a medium flow configuration by attaching a larger diameter section of piping 16 to the lower ports 36 on each fluid connections 18, 20, 22 (not shown). In this arrangement, the upper, smaller ports 36 will be sealed closed. It will be understood that the size of piping 16 selected will match the port size 36. A high flow configuration is shown in FIGS. 2 and 5, wherein sections of piping 16 are attached in parallel to all ports 36 between fluid connections 18, 20, 22 to provide a flow rate based on the combined flow area of each port 36.

While the modular design described immediately above is given in the context of a fluid connector 10 connected in a loop configuration with two inlets 18, 20, it will be understood that a similar design principle may be applied to other fluid connectors 10 that use a different design. For example, in a manifold in which fluid flows in a single direction, parallel ports 36 may also be used to increase the capacity. There may be additional complications related to the valves 26, 28 that would be required in this type of system.

When installing the depicted fluid connections 18, 20, 22 that have been provided with more than one parallel fluid port 36, there will first be the step of determining the maximum rate of flow that will be required to be supported by the fluid connector 10. This will generally be determined by the operator, who may define the maximum flow rate as the anticipated operating flow, or greater than the anticipated operating flow rate to allow for some flexibility. In general, with respect to non-homogenous fluids, such as frac fluids that carry proppant, the fluid velocity through the fluid connector 10 will fall within a preferred range as known in the art to ensure the non-homogenous fluid does not separate unduly as it is being flowed to the well 14, but without being so high as to result in safety or structural concerns. Once the design flow rate has been defined, the required flow area can be calculated, and piping 16 will be connected between the desired port 36, or both ports 36, to provide sufficient flow area to allow for the design flow rate, with the understanding that the actual flow rate will also depend on the fluid velocity or pressure, in combination with the flow area. In addition, the equipment upstream of the inlets 18, 20 or downstream of the outlets 22 will also depend on the intended flow rate. For example, the embodiment in FIG. 5 does not have a frac tree header 24 to connect between the outlet 22 of the fluid connector 10 and the sweeping trunkline 34 into the frac tree 30.

If the fluid connections 18, 20, 22 have a single fluid port 36, an appropriately sized fluid connections 18, 20, 22 may be selected that is able to support the necessary flow rate. As this may require additional manufacturing, or increased stock, connections 18, 20, 22 with multiple ports 36 are preferred as single connections 18, 20, 22 can be used to support a range of fluid flow rates.

The fluid connector 10 is installed by connecting the first and second inlets 18, 20 to the fluid supply, and the inlets 18, 20 are connected to the outlets 22 in series by sections of piping 16, such that a loop is formed. A first well 14 to be treated is designated, and the valves 26, 28 associated with this well 14 are opened while at least the valves 28 associated with the other wells 14 are closed. The fluid supply provides pressurized fluid to the first and second inlets 18, 20, which travels in parallel paths from the first and second inlet 18, 20 to the outlet 22 corresponding to the well 14 that is being treated. Once the treatment is completed, at least the valves 28 associated with the well 14 that was treated are closed, the valves 26, 28 associated with the next well 14 to be treated are opened, and the pumping process continues. Separately from valves 28, valves 26 may be opened to allow another downhole operation to proceed simultaneously. In many operations, such as fracturing operations, only one well 14 will be treated at a time. By providing parallel flows in each direction around the fluid connector 10, a continuous flow is maintained through all sections of piping 16, which reduces the amount of sediment that may accumulate in an unused section of piping 16, as may otherwise occur in other systems. It also reduces the number of valves that must be actuated to redirect fluid into another well 14.

There will now be described a specific example in the context of a hydraulic fracturing operation.

Referring to FIG. 1, there is shown an example of a frac fluid connector 10 for conducting a hydraulic fracturing operation based on the principles described above. The frac fluid connector 10 may be referred to as a multi-well frac connector, or MWFC. The MWFC has the following elements described below. It will be understood that some elements may be substituted, omitted, or other elements may be used to achieve similar results. It will also be understood that the elements will be designed and manufactured to be in compliance with required standards, such as API.

Left and Right Inlet Target MWFC Headers (18, 20)
    Inlet collector headers complete with multiple frac fluid inlets (in a linear configuration)
    Upper and lower end outlet connections for frac fluid discharge (180 degrees apart)

Lower MWFC Piping (16)
    Flanged end connections
    Medium flow rate frac fluid delivery piping.
    Configuration is a combination of a sweeping trunkline & a straight trunkline Upper MWFC Piping (16)
    Flanged end connections
    Low flow rate frac fluid delivery piping
    Configuration consists of a combination of sweeping trunkline & straight trunkline
    Upper and lower connections may be used separately or independently to provide low and medium flow rates, respectively. A low rate configuration is shown in FIG. 3. For high rate pumping operations, both upper and lower connections may be utilized for frac pumping operations, as shown in FIG. 2.

Discharge MWFC Header (22), or outlet connection:
    A MWFC discharge header is complete with upper and lower end ports (180 degrees apart) to facilitate connection of piping, sweeping trunkline and strait trunkline
    Has multiple discharge ports (in a linear configuration).
    Is orientated horizontally to parallel the MWFC inlet frac tree header
    Is located adjacent and in proximity to the frac tree inlet header
    Connects to the MWFC frac tree inlet header by means of multiple swivel joints MWFC Inlet Frac Tree Header (24)
    The MWFC frac tree inlet header used is complete with multiple frac fluid inlets ports (in a linear configuration) converging into a single discharge outlet port. The MWFC frac tree inlet header is oriented horizontally and facilitates the initial point of entry into the frac tree for frac fluid that is being pumped into a subject well.
    Multiple swivel joints are utilized to connect the MWFC frac tree inlet header to the MWFC discharge header component.

MWFC Sweeping Trunkline (34)
    Provides a full bore sweeping flanged trunkline The depicted MWFC sweeping trunkline, keeps frac fluid flowing in a laminar flow pattern to reduce erosion MWFC Multi-Purpose Cross (38) positioned and connected above the lower and upper frac tree master valves (26) in the frac tree (30)

May be used for flowback, pumpdown pumping and frac pumping

Frac flow inlet of the cross is preferably machined at a 45-degree inlet to keep frac fluid flowing in a laminar pattern, to reduce friction and reduce erosion, Is configured with the frac fluid inlet port below the flowback ports to minimize erosion on the flowback gate valves during frac pumping operations.

Referring to FIG. 5 through 8, an alternative design is shown that omits the swivel joints 32 and the discharge MWFC header (22), such that the sweeping trunkline 34 connects directly to the vertically oriented MWFC Inlet Frac Tree Header (24).

It will be understood that the equipment described herein and shown may be modified while still performing the same basic function. As an example, the depicted sweeping trunkline 34 is used to reduce wear that may result from the proppant carried by the frac fluid in a fracturing operation. Other piping solutions may also be used, or may not be required in other situations where the fluid being pumped is not abrasive, or does not carry abrasives. Furthermore, the depicted frac tree 30 may be designed, modified, or omitted, depending on the preferences of the user, and the actual downhole operation being performed, which may result in a different fluid composition and a different pressure or flow rate being pumped into the wells 14.

As will be recognized by those skilled in the art, the features described herein may be combined together in any reasonable combination.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A fluid connector for connecting a fluid source to supply fluid to a plurality of wells to conduct a downhole operation, the fluid connector comprising:
a fluid conduit that connects the fluid source to the plurality of wells, the fluid conduit comprising a first fluid inlet, a second fluid inlet, and a plurality of fluid discharge headers connected in series between the first fluid inlet and the second fluid inlet such that the fluid conduit defines a flow path between each of the first and second fluid inlets and each of the plurality of fluid discharge headers, each fluid discharge header comprising lateral ports on opposed sides and an outlet port on a top surface and in fluid communication with the lateral ports, the lateral ports being connected by a straight line that is parallel to the flow path and the outlet port defining a vertical outlet path that is perpendicular to the flow path of the fluid conduit, wherein, in operation, the first and second fluid inlets are connected to receive fluid from the fluid source;
a plurality of trunk lines and a plurality of frac trees, each frac tree being mounted to one of the plurality of wells, wherein each trunk line has a first end connected to the outlet port of one of the plurality of fluid discharge headers and a second end connected to one of the plurality of frac trees, the first end of each of the plurality of trunk lines being parallel to the vertical outlet path immediately adjacent to the outlet port, and each frac tree defining a vertical injection path into one of the plurality of wells, wherein a common vertical plane intersects each of the outlet port of the respective fluid discharge header, an entirety of the trunk line, and the corresponding frac tree; and
a plurality of isolation valves connected downstream of each of the plurality of fluid discharge headers relative to the first and second fluid inlets and upstream of each well, and the fluid is selectively supplied to the plurality of wells by opening and closing the isolation valves.

2. The fluid connector of claim 1, wherein the fluid is selectively supplied to the plurality of wells by selectively opening and closing the plurality of isolation valves.

3. The fluid connector of claim 1, wherein each of the first and second fluid inlets and the plurality of fluid discharge headers comprises two or more sets of lateral ports, and the fluid conduit comprises more than one section of piping connected in parallel between ports that are adjacent along the flow path, and wherein, for each fluid discharge header, there is a single outlet port in fluid communication with each of the sets of lateral ports.

4. The fluid connector of claim 1, wherein the fluid conduit is devoid of valves such that the flow path is open between the first and second fluid inlets and each of the plurality of fluid discharge headers.

5. The fluid connector of claim 1, wherein each trunk line defines a single continuous arc between the respective fluid discharge header and the vertical injection path of the frac tree.

6. In combination:
a fluid source;
a plurality of wells; and
a fluid connector that connects the fluid source to the plurality of wells, the fluid connector comprising:
a fluid conduit that connects the fluid source to the plurality of wells, the fluid conduit comprising a first fluid inlet, a second fluid inlet, and a plurality of fluid discharge headers connected in series between the first fluid inlet and the second fluid inlet such that the fluid conduit defines a flow path between each of the first and second fluid inlets and each of the plurality of fluid discharge headers, each fluid discharge header comprising lateral ports on opposed sides and an outlet port on a top surface and in fluid communication with the lateral ports, the lateral ports being connected by a straight line that is parallel to the flow path and the outlet port defining a vertical outlet path that is perpendicular to the flow path of the fluid conduit, wherein, in operation, the first and second fluid inlets are connected to receive fluid from the fluid source;
a plurality of trunk lines and a plurality of frac trees, each frac tree being mounted to one of the plurality of wells, wherein each trunk line has a first end connected to the outlet port of one of the plurality of fluid discharge headers and a second end connected to one of the plurality of frac trees, the first end of each of the plurality of trunk lines being parallel to the vertical outlet path immediately adjacent to the outlet port, and each frac tree defining a vertical injection path into one of the plurality of wells, wherein a common vertical plane intersects each of the outlet port of the respective fluid discharge header, an entirety of the trunk line, and the corresponding frac tree; and a plurality of isolation valves connected downstream of each of the plurality of fluid discharge headers relative to the first and second fluid inlets and upstream of each well, wherein the fluid is selectively supplied to the plurality of wells by opening and closing the isolation valves.

7. The combination of claim 6, wherein the isolation valves are selectively operable to supply fluid to a single one of the plurality of wells at a time.

8. The combination of claim 7, wherein the isolation valves are selectively operable to supply fluid to another single one of the plurality of wells without restricting the flow path between each of the first and second fluid inlets and each of the fluid discharge headers.

9. The combination of claim 6, wherein each trunk line defines a single continuous arc between the respective fluid discharge header and the vertical injection path of the frac tree.

10. A method of conducting a downhole operation in a plurality of wells, comprising the steps of:

connecting a fluid source to the plurality of wells using a fluid connector, the fluid connector comprising:

a fluid conduit comprising a first fluid inlet, a second fluid inlet, and a plurality of fluid discharge headers, the fluid conduit defining a flow path between the first and second fluid inlets, the first and second fluid inlets are connected to receive fluid from the fluid source, and the plurality of fluid discharge headers are connected to supply fluid to the plurality of wells, the plurality of fluid discharge headers being connected in series between the first fluid inlet and the second fluid inlet, each fluid discharge header comprising lateral ports on opposed sides and an outlet port on a top surface and in fluid communication with the lateral ports, the lateral ports being connected by a straight line that is parallel to the flow path and the outlet port defining a vertical outlet path that is perpendicular to the flow path of the fluid conduit; and a plurality of trunk lines and a plurality of frac trees, each frac tree being mounted to one of the plurality of wells, wherein each trunk line has a first end connected to the outlet port of one of the plurality of fluid discharge headers and a second end connected to one of the plurality of frac trees, the first end of each of the plurality of trunk lines being parallel to the vertical outlet path immediately adjacent to the outlet port, and each frac tree defining a vertical injection path into one of the plurality of wells, wherein a common vertical plane intersects each of the outlet port of the respective fluid discharge header, an entirety of the trunk line, and the corresponding frac tree; and a plurality of isolation valves connected downstream of each of the plurality of fluid discharge headers relative to the first and second fluid inlets and upstream of each well; and selectively opening and closing the isolation valves to selectively supply fluid to the plurality of wells via the trunk lines.

11. The method of claim 10, wherein fluid is supplied to a single one of the plurality of wells at a time.

12. The method of claim 11, wherein the fluid is supplied to the fluid discharge header connected to the single one of the plurality of wells simultaneously along parallel fluid paths from each of the first fluid inlet and the second fluid inlet.

13. The method of claim 10, wherein each of the first and second fluid inlets and the plurality of fluid discharge headers comprises two or more parallel ports, and further comprising the step of determining a desired flow area of the fluid conduit, and selectively connecting one or more sections of piping between parallel ports that are adjacent along the flow path and to achieve the desired flow area of the fluid conduit.

14. The method of claim 10, wherein fluid is selectively supplied to the plurality of wells by opening and closing the isolation valves and without restricting the flow path along the fluid conduit.

15. The method of claim 10, wherein the downhole operation is a hydraulic fracturing operation or a pumpdown operation.

16. The method of claim 10, wherein each trunk line defines a single continuous arc between the respective fluid discharge header and the vertical injection path of the frac tree.

* * * * *